United States Patent Office 3,253,899
Patented May 31, 1966

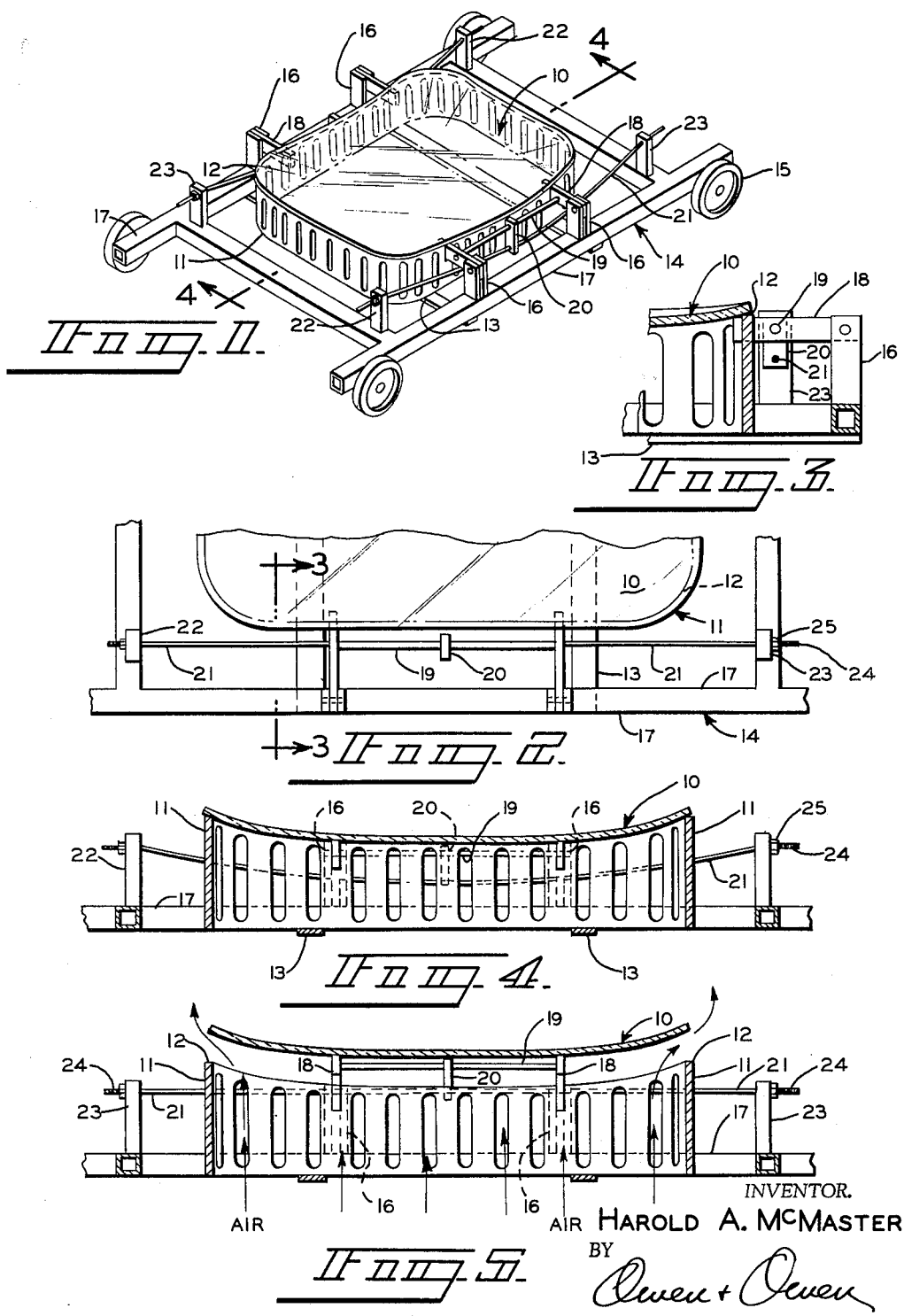

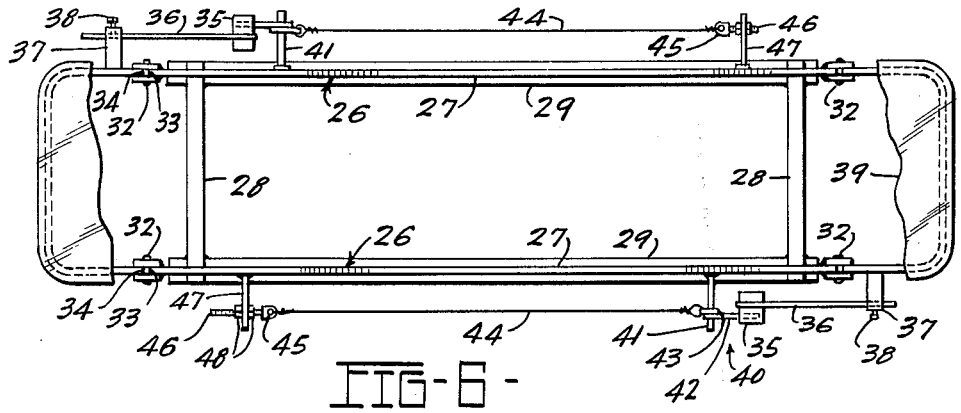
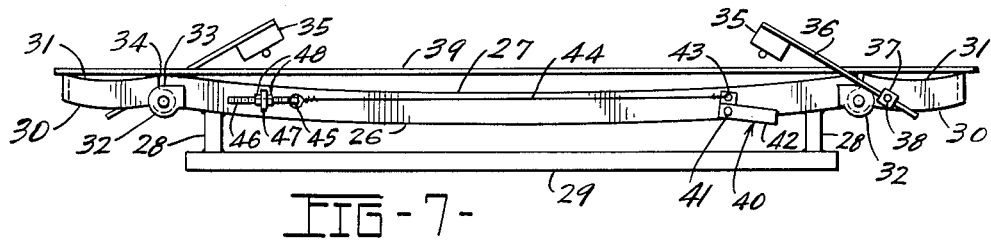
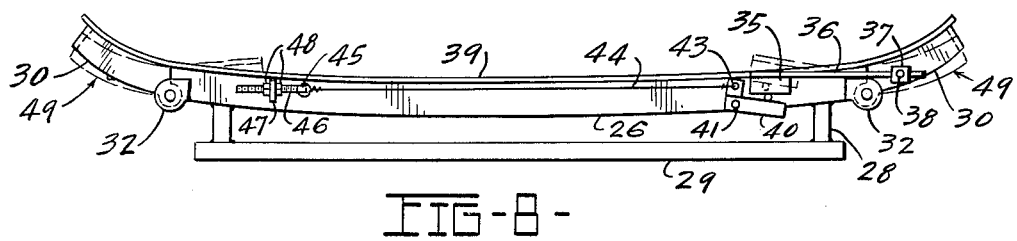
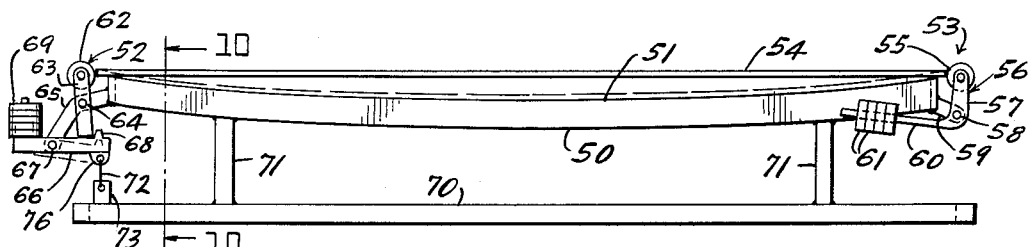
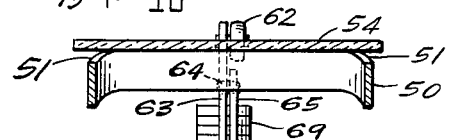
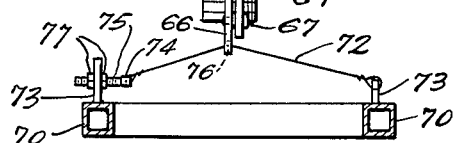

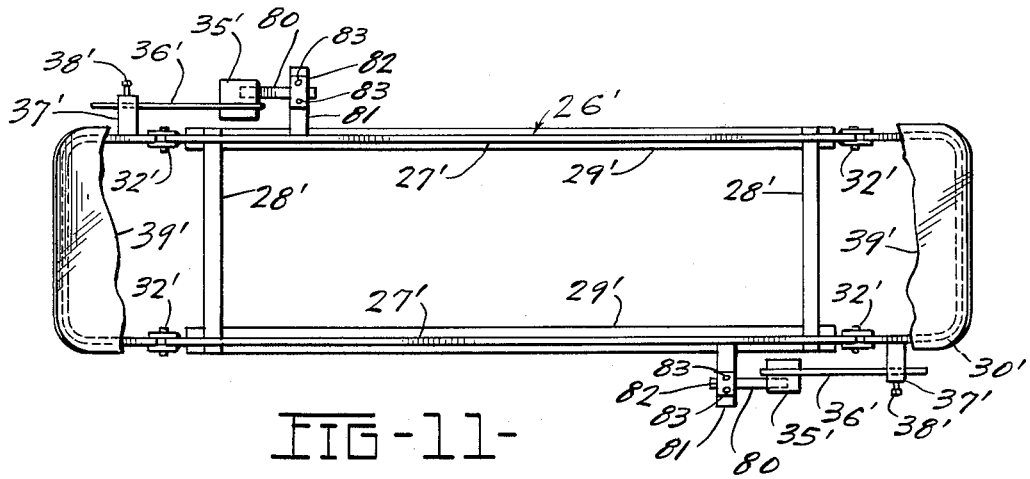
FIG-11-
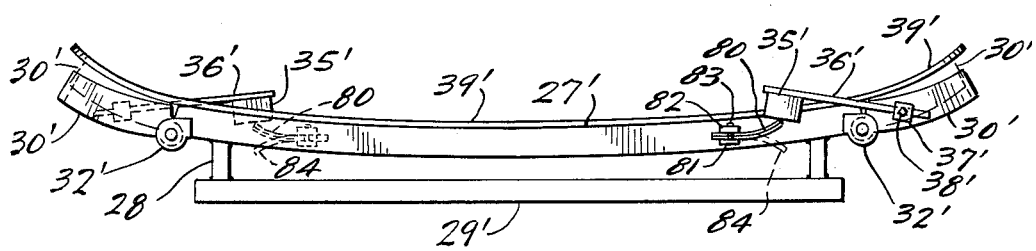
FIG-12-

3,253,899
MEANS FOR RELEASING STRESSES PRODUCED IN GLASS DURING COOLING IN A GLASS SHAPING MOLD
Harold A. McMaster, Woodville, Ohio, assignor to Permaglass, Inc., Woodville, Ohio, a corporation of Ohio
Filed May 19, 1964, Ser. No. 368,541
9 Claims. (Cl. 65—289)

The present application is a continuation-in-part of my co-pending application Serial No. 162,071, filed December 26, 1961, now abandoned.

The present invention relates generally to molds for curving sheets of glass in which the glass becomes wedged during the cooling of the glass in the mold.

Curved sheets of glass are used for many purposes, including television implosion plates for the faces of television tubes, back lights for automotive vehicles, curved corner windows for vehicles, sections of boat windshields, etc. Molds for forming such pieces usually have side edges, the top surfaces of which have the desired curvature. In some instances where the ends of the glass are to have a pronounced curvature, such as the windshields or back lights of automobiles, the ends of the molds are hinged to move downwardly out of the way in order to receive a flat sheet of glass prior to bending. Molds having these hinged end portions are called wing molds, and weights are provided to cause the hinged ends or wings to swing upwardly as the glass is heated and softened to produce the desired end curvature. In some molds where accurate alignment with respect to the mold surfaces is desired, a fixed abutment may be provided at one end of the mold, and a counter weighted hinged abutment may be provided at the other end of the mold. A flat sheet of glass is placed between the fixed hinge abutments, and as the glass is heated, it is held against the fixed abutment and thereby caused to be accurately centered in the mold. In all of the mold structures above described, the glass is restrained during cooling in some degree either between abutments or by frictional engagement with the curved end portions of the mold. The metal molds contract to a greater degree during cooling than does the glass, and the restraining action above described may result in chipping and cracking the edges of pieces of glass processed in the molds.

A principal object of the invention is the provision of new and improved means for releasing the forces exerted on a sheet of glass that is sagged onto the curved surfaces of the mold during cooling down of the mold and the glass supported therein.

These and other more specific objects and advantages of a device embodying the invention will be better understood from the specification which follows and from the drawings, in which:

FIG. 1 is a view in perspective of a glass shaping mold and its carriage, the mold being equipped with a glass lifter embodying the invention;

FIG. 2 is a fragmentary plan view of the mold and carriage illustrated in FIG. 1;

FIG. 3 is a fragmentary, vertical sectional view taken along the line 3—3 of FIG. 2 and shown on an enlarged scale;

FIG. 4 is a vertical sectional view taken from the position indicated by the line 4—4 of FIG. 1 and showing a glass sheet in contact with the shaping mold during the latter portion of the heating steps of a manufacturing cycle;

FIG. 5 is a view similar to FIG. 4 but showing a glass lifter embodying the invention in action to elevate the glass sheet out of contact with the glass mold upon the initiation of the tempering step of a manufacturing cycle;

FIG. 6 is a plan view of a wing mold embodying principles of the present invention;

FIG. 7 is a side view in elevation of the wing mold shown in FIG. 6 with a flat sheet of cold glass placed thereon;

FIG. 8 is a side view in elevation similar to FIG. 7 but showing the wings moved to their raised positions and the glass sagged into its finished curved position—the view further showing by means of dot-dash lines the position the wings assume upon cooling of the mold;

FIG. 9 is a side view in elevation of another embodiment of the invention showing a shallow mold with a flat sheet of glass placed between end abutments one of which is hinged and weighted to cause the glass to be properly centered in the mold when sagged into its finished curved position shown by dash lines;

FIG. 10 is a sectional view taken along the line 10—10 of FIG. 9;

FIG. 11 is a plan view similar to FIG. 6 but showing another embodiment of the invention; and FIG. 12 is a side view in elevation of the embodiment shown in FIG. 11.

As can be seen in FIGS. 1–5 of the drawings an implosion plate 10 is generally rectangular in plan with arcuate corners and is curved in both directions across its face, the degree of curvature at the edges being determined by the contours of a ring mold 11 and by the degree and duration of heating in a furnace. The ring mold 11 is shown as having its continuous vertical wall substantially cut away in order to reduce its heat retaining ability and as having a continuous upper edge 12 contoured in accordance with the desired contour of the edge of the implosion plate 10.

The ring mold 11 is supported by cross members 13 carried by an open framework carriage 14 which is illustrated as being provided with rollers 15 in order that the carriage 14 may be moved through a heating and tempering furnace.

In the embodiment of the invention illustrated in FIGS. 1–5 of the drawings, a pair of pivot posts 16 is erected on each of the side members 17 of the carriage 14, the pivot posts 16 being spaced from each other a distance determined by the size of the glass sheet, in this case the implosion plate 10, which is being shaped upon the ring mold 11 and the two pivot posts being of the same height. If a long and narrow sheet of glass, as for example a backlight for an automotive vehicle or a long curved windshield for a boat or a similar sheet of glass is being formed upon the mold, then there could be more than one pair of pivot posts 16 spaced along the length of the mold.

Each of the posts 16 pivotally supports a lifter finger 18, and, in this embodiment of the invention, the fingers 18 are at the same height above the side members 17 and are connected by a cross bar 19. In other embodiments of the invention, the pivot posts and the relative vertical positions of the fingers 18 might be different in order to provide for a deep curvature in the glass after bending and the fingers 18 might be independent of each other. A strut 20 is rigidly connected to the cross bar 19 extending downwardly therefrom. A heat responsive tension tape 21 is stretched at each side of the mold 11, extending through the lower end of the strut 20 and being connected rigidly at one end to a post 22 and adjustably fastened at its other end to a similar post 23. In other embodiments, for example, when the fingers 18 are independent and not connected by a cross bar, each finger would have its own strut connected to the tension tape. As can more readily be seen in FIGS. 4 and 5, each of the tension tapes 21 is connected to a boltlike member 24 and a nut 25 is threaded onto the member 24 to adjust the position of the member 24 and thus the initial sag in the tension tape 21 at room temperature and before the mold carriage 14 is subjected to heating in the furnace or chilling in the tempering position.

Adjustment of the initial length of the tensioning tapes 21 is necessary for two reasons. First, it is desirable that there be a slight delay between the time of entry of the glass into the chilling area of the tempering blast in order to allow the glass to begin to harden so that it will not be warped when lifted off of the mold 11 as might occur if lifter fingers 18 were pulled upwardly by the initial tightening of the tensioning tapes 21, which occurs immediately upon their being subjected to the chilling effect of the tempering blast. Second, it is necessary to provide for adjustment of both of the tensioning tapes 21 in order to properly set them so that, upon ultimate contraction due to the chilling effect of the tempering blast, they will lift the glass uniformly upwardly from both sides of the mold 11.

In order to achieve quick response to the chilling effect of the tempering blast, the tensioning tapes 21 may be made in various sizes in accordance with the thickness of the glass, in order to provide for the slight delay mentioned just above and also to provide for the desired degree of lift. For examples, fabrication of the tensioning tapes from an alloy metal containing 80% nickel and 20% chromium with dimensions of .020 inch by .093 inch in size has been found to be satisfactory for the tempering of a 3/16 inch implosion plate. As another example, in the tempering of a 1/4 inch thick backlight or automobile rear window which may measure as much as five feet by two feet in size, a ribbon of 80% nickel and 20% chromium having a cross sectional dimension of .030 inch by .187 inch has been found satisfactory. In this latter case, of course, several sets of lifter fingers 18 might be actuated by a single stretch of ribbon from one end to the other end of the mold or two or more sets of ribbons might be used with the corresponding pairs of lifter fingers, the fingers being positioned at suitable places along the length of the glass and at different heights.

While the illustrated embodiment of the invention employs tapes 21 as the tensioning elements, it is to be appreciated that ribbons, wires or rods of small cross section may also be employed.

It is not necessary that the coefficient of linear thermal expansion of the mold and the tensioning elements be different. The extremely rapid change in the linear dimension of the tensioning elements as compared to the mold results, of course, from the much higher ratio of surface area to cross section of metal in the tensioning element. Therefore, at constant temperature conditions, as for example, in rest positions between treatment cycles or during the heating portions of the treatment cycles, the tensioning elements are slack relative to the molds. It is only during the rapid reduction in environmental temperature experienced when the molds enter the quenching or tempering blast, that the tensioning elements contract relative to the molds.

The wind mold structure shown in FIGS. 6, 7 and 8 of the drawings generally comprises a pair of side rails 26, the top surfaces 27 of which are slightly concave to conform to the curvature of the center section of the rear light of an automotive vehicle. The side rails 26 are spaced apart by cross members 28 which set upon and are welded to the top surface of longitudinal extending base members 29. A pair of wings 30 having upper surfaces 31 which are sharply curved upwardly are hinged to the ends of the side rails 26 by a plurality of identical hinges 32. The adjacent edges 33 and 34 of the side rails 26 and wings 30 are hinged in such manner as to abut each other when the wings 30 are moved upwardly into a position providing the desired end curvature for the sheet of glass to be processed by the mold. The wings 30 are biased to their upper positions wherein the end surfaces 33 and 34 abut each other by means of counter weights 35, one of which is attached to each of the respective wings by levers 36 which extend through an opening in a bracket 37 fixed to the respective side of the respective wings 30. The levers 36 can be adjusted in the brackets 37 and clamped in place by means of set screws 38.

The mold structure shown in FIGS. 6, 7 and 8 of the drawings is used by placing a flat sheet of cold glass 39 on the mold as shown in FIG. 7, in which case the weight of the glass is caused to bear against the outer ends of the wings 30 to cause them to assume the position shown in FIG. 7. The mold with the glass thereon is then placed into a heating furnace and the mold and glass are raised to a suitable elevated temperature at which the glass sags down into engagement with the top surface 27 of the side rails 26. The counter weights 35 then exert sufficient force to bend the ends of the glass upwardly and cause the hinged structures 32 to assume the position shown by the solid lines in FIG. 8.

After the hinged structures 32 have closed and the glass has assumed the shape shown in FIG. 8, the mold is removed from the furnace and allowed to cool. The side rails, wings and base structure of the mold are usually made of a stainless steel to avoid undue oxidation, and upon cooling of the mold, the mold elements shrink to a greater degree than does the glass that is supported thereon. Sufficient frictional engagement exists between the curved ends of the glass structure and the wings 30 so that, even though the wings 30 are hinged, cracking and chipping of the glass may take place during the cooling of the mold.

According to the present invention, the mold structure shown in FIGS. 6, 7 and 8 is provided with structure which will swing the wings 30 downwardly by a sufficient distance during the cooling of the mold, to lessen the force on the glass and thus avoid glass damage. The structure shown for producing an opening movement of the wings 30 comprises a pair of L-shaped levers 40, one for each of the wings 30, pivoted on pins 41. Horizontal legs 42 of the L-shaped levers are positioned under the counterweights 35 with which they cooperate, and vertically extending legs 43 have one end of a fast cooling wire ribbon 44 attached thereto. The other ends of the ribbons 44 are fastened to eyes 45 of respective threaded bolts 46 which extend through brackets 47, and each is adjustably clamped in place by a pair of nuts 48. By properly adjusting the position of the bolts 46 in the brackets 47 a desired amount of slack will be provided for each ribbon 44 which will allow the ends of the glass to harden prior to the time that the ribbons 44 become sufficiently taut to turn the L-shaped levers 40 into engagement with the counterweights 35. Thereafter additional cooling of the mold structure causes the ribbons 44 to contract faster than the mold structure, and the L-shaped levers 40 lift the counterweights 35 upwardly to swing the wings 30 downwardly out of engagement with the ends of the glass as shown by the dot-dash lines 49 in FIG. 8.

The embodiment of the mold structure shown in FIGS. 9 and 10 of the drawings has a continuous ring mold 50 which is generally rectangular in shape and has an upper edge 51 that is curved downwardly at its center to provide a desired curved configuration to glass when sagged thereagainst. The embodiment shown in FIGS. 9 and 10 differs from the embodiments previously described principally in that abutment structures 52 and 53 are provided on opposite ends of the glass so as to accurately center a sheet of glass with respect to the upper edge 51 when placed between the abutment structures 52 and 53. The abutment structure 52, which will later be described in detail, is arranged to be fixed with respect to the ring mold 50 except during the cooling cycle of the mold. The abutment structure 53, however, is arranged to continually bias the sheet of glass towards the abutment structure 52. The movable abutment structure 53 may be made in various manners. The abutment structure 53 shown in the drawing has a roller 55 which bears against the glass. The roller 55 is pivotally mounted on the upper leg 56 of an L-shaped lever 57 that in turn is pivoted as at 58 to a bracket 59 welded to the end of the ring mold 50. A horizontal leg 60 extends towards the center of the mold and has a plurality of counterweights 61 which bias the abutment roller 55 towards the center of the mold.

The abutment structure 52 which is held stationary except during the cooling cycle of the mold, can be made in a number of ways which will provide movement away from the mold during the cooling cycle. In the embodiment shown, the abutment structure 52 comprises a roller 62 carried on the upper end of a lever 63 that is pivoted adjacent its center point, as at 64, to a bracket 65 welded to the opposite end of the ring mold 50. The forces that are produced upon the glass during the cooling cycle of the mold, as well as the forces which are exerted on the glass due to the movable abutment structure 53 tend to move the roller 62 away from the mold and the bottom end of the lever 63 towards the center of the mold. Movement of the lever can be prevented by any suitable latch mechanism, and, as shown in the drawing, a latch lever 66 is connected as at 67 adjacent its center point to the bottom end of the bracket 65. The end of the latch lever 66 closest to the center of the mold has a vertical dog 68 which engages the bottom inner face of the lever 63, and the outer end of the lever is provided with a plurality of counterweights 69 to normally urge the dog 68 into a position which restrains movement of the roller 62 away from the mold 50.

The ring mold 50 is supported from a pair of base rails 70 by a pair of cross members 71 positioned between the base rails 70 and the ring mold 50 adjacent the opposite ends of the mold.

Movement of the dog 68 out of engagement with the bottom end of the lever 63 is produced during the cooling cycle of the mold by means of a tension member 72 whose coefficient of expansion and rate of cooling relative to the mold structure 50 are such that it will contract relative to the mold structure 50 by an amount which moves the dog 68 out of engagement with the lever 63 after the glass 54 has become rigid. The tension member 72 may be a wire or a ribbon, and may be arranged in any suitable manner which will remove the dog 68 from engagement with the lever 63 at the proper time during the cooling cycle.

In the embodiment shown in FIGS. 9 and 10 a bracket 73 is mounted on the same end of each of the base rails 70 in line with the inner end of the latch lever 66. One end of the ribbon 72 extends through an opening in one of the brackets 73 and is fixed thereto, and the other end of the ribbon 72 is fixed to an eye 74 of a threaded bolt 75 that extends through an opening in the other bracket 73. The center of the ribbon 72 passes through an opening 76 in the inner end of the latch lever 66. The opening 76 is positioned above the points of attachment of the ribbon 72 with the brackets 73 so that the ribbon 72 will normally have a bowed shape. A desired amount of slack is provided by adjusting the position of the threaded bolt 75 in the bracket 73 by means of a pair of nuts 77 on opposite sides of the bracket 73. The amount of slack which is provided is such that a predetermined amount of shortening of the ribbon 72 will take place during cooling of the mold to allow the glass to become rigid before the ribbon 72 straightens to an extent which pulls the dog 68 out of engagement with the lower inner end of the lever 63. When the dog 68 is moved out of engagement with the lever 63, restraining force upon the end of the glass is removed, and inasmuch as the mold ring 50 has but a slight curvature, insufficient friction between the glass and the curved ends of the molds exists to prevent relative movement between the glass and the mold during the remaining cooling cycle of the mold and glass. Inasmuch as the opposite abutment 53 is movable, relative movement between the glass and mold takes place at this end of the mold structure also.

The embodiment shown in FIGS. 11 and 12 of the drawings is generally similar to that shown in FIGS. 6 through 8, and differs principally therefrom in that a bimetallic element 80 is used in place of a tension member to cause separation between the glass and the surfaces of the mold. Those portions of FIGS. 11 and 12 which correspond to like portions of FIGS. 6 through 8 are designated by a like reference numeral characterized further in that a prime mark is affixed thereto.

The bimetallic element 80 may be made of any suitable dissimilar metals, and may be fixed to the frame of the mold in any suitable manner which will allow the bimetallic element to cool down when the mold, with the curved hot sheet of glass thereon is moved into a cooling environment. In the embodiment shown in FIGS. 11 and 12, one end of a curved bimetallic strip 80 is positioned on top of a horizontally extending bracket 81 that is welded to the side of the frame 26', and is clamped in place by means of a holddown bar 82 and through bolts 83. The free end of the bimetallic element 80 is positioned beneath the weights 35' which normally bias the wings 30' of the mold structure upwardly. In the cold position of the bimetallic elements 80, the element assumes the position shown in FIG. 12 wherein they abut the weights 35' and lower the wings 30' from the upper or closed position of the wings 30'. When a flat sheet of glass 39' is placed upon the mold, it will cause the wings of the mold to move downwardly, and when the mold is placed in a furnace, the bimetallic elements 80 will bend downwardly to the dash line position indicated at 84. This allows the hinge 32' to close and the wings 30' to move to their upper position adjacent the glass 39' as seen in FIG. 12. When the mold with the hot curved sheet of glass is moved into a cooling environment, the glass rigidifies into the position shown in FIG. 12, and thereafter the bimetallic elements 80 move into engagement with the weights 35' to move the wings 30' downwardly out of engagement with the ends of the glass 39'. In the final cooled condition of the mold structure, the bimetallic elements will be in the position shown in FIG. 12, and the wings 30' will be in the position shown by the solid lines of FIG. 12.

While the invention has been described in considerable detail, it is not intended that it should be limited to the particular embodiments shown and described, and it is desired to cover hereby all novel adaptations, modifications, and arrangements thereof which come within the practice of those skilled in the art to which the invention relates.

What I claim is:

1. In a mold structure having a frame including an upwardly facing curved mold surface and that is adapted to receive a generally flat sheet of glass to be bent into contact with said curved mold surface, which mold structure has opposite end portions that restrain endwise relative movement between said mold and the glass when said sheet sags into contact therewith, the improvement comprising a temperature responsive member mounted on said frame, said member having a response to temperature change different from that of said frame so that said member moves relative to said frame as the environmental temperature changes, and means operatively connected to said member for effecting relative separation between (1) a sheet of glass rigidified onto said curved mold surface and (2) at least one of said opposite end glass restraining surfaces of said mold structure when said mold and said glass are cooled.

2. Means for disengaging a glass sheet and a mold having a peripheral surface upon which the edges of the glass sheet rest after heat treatment for bending the glass to a configuration determined by the peripheral surface of the mold, said means comprising, in combination, thermally responsive means carried on said mold and providing a moving force upon a rapid reduction in environmental temperature, mechanical means mounted on said mold for effecting relative movement between said glass sheet and at least a major part of the peripheral surface of said mold for disengaging the same, and means actuating said mechanical means in response to such force.

3. In a mold structure having a frame which has an upwardly facing mold surface adapted to receive a generally flat sheet of glass to be bent, which mold structure has opposite end portions that curve generally in the same direction relative to the plane of the flat sheet to provide a desired mold curvature at the temperature at which glass placed on said structure sags into contact with said curved surface, an abutment opposite one edge of the mold surface adapted to be abutted by an edge of the sheet of glass, said abutment being movable away from said edge of the mold surface, a latch mechanism which when in a first position prevents said abutment from moving away from said edge of the mold surface and when in a second position releases said abutment, a tension member carried by said mold structure, said tension member having a coefficient of expansion and a rate of cooling relative to that of said mold structure to produce mechanical movement of a portion of said tension member when said mold structure at glass sagging temperature is placed in a cooling atmosphere, said portion of said tension member being operably connected to said latch mechanism to move said latch mechanism to said second position when a hot mold structure is cooled from said glass sagging temperature.

4. A glass lifter for a shaping mold, said mold having a peripheral surface upon which the edges of a sheet of glass rest during heat treatment, said lifter comprising lifting elements adapted to engage beneath the edges of said glass sheet on opposite sides thereof, means for mounting said lifting elements for vertical movement between a first position out of contact with said glass and a second position contacting said glass and holding said glass out of contact with said mold, and thermally responsive means for moving said lifting elements from first position to second position in response to a rapid reduction in environmental temperature and for returning said elements to said first position at rest and at elevated environmental temperatures.

5. A glass lifter according to claim 4 in which said lifting elements are pivotally mounted, fingers extending through the peripheral surface of said mold and beneath the edges of said glass sheet when in first position and said thermally responsive means acts to swing said fingers upwardly into contact with the edges of said glass sheet en route to second position.

6. A glass lifter according to claim 4 in which the thermally responsive means are ribbons of heat responsive material, and which has means for mounting said ribbons adjacent said mold and means for connecting said ribbons to said lifting elements whereby a sharp drop in the environmental temperature causes said ribbons to contract and raise said lifting elements.

7. A glass lifter for a bending and tempering mold, said mold having a skeletal peripheral surface upon which the edges of a sheet of glass rest during heating and bending thereof, the upper edges of said mold surface having notches therein opening upwardly, a lifting finger extending generally horizontally through each of said notches, a support mounting said finger for pivotal movement on a horizontal axis, a thermally responsive ribbon, end supports for said ribbon, a thrust strut connecting said ribbon to said finger, said ribbon being contracted by a sharp drop in environmental temperature, and cooperating means on said ribbon and one of said supports for initially tautening said ribbon to a degree selected to provide for initial contraction thereof without engagement of said finger with the underside of a glass sheet on said mold surface and final contraction thereof to a degree selected to provide for movement of said fingers to lift such glass sheet out of contact with said mold surface.

8. In a mold structure having a frame which has an upwardly facing mold surface adapted to receive a generally flat sheet of glass to be bent and which mold surface has a desired mold curvature at a predetermined temperature at which glass placed on said structure sags into contact with said mold surface, said mold structure having at least one end restraining surface which contacts an end portion of said glass when said mold surface is in the desired curvature and the sheet of glass is in contact therewith, said end surface normally being restrained against movement relative to said desired mold curvature and glass thereon to apply force to said glass when said mold cools from said temperature at which glass sags into contact with said desired curvature: a heat responsive member carried by said mold structure, said heat responsive member having a coefficient of expansion and a rate of cooling relative to that of said frame to produce mechanical movement of a portion of said heat responsive member when said mold structure is at said predetermined temperature and is placed in a cooling environment, first means arranged when moved to relieve said restraining force between one of said ends of the glass when the glass has assumed the desired mold curvature, and second means operatively connecting said portion of said heat responsive member and said first means for actuating said first means to relieve restraining force on said end of said glass when said mold structure is cooled from said predetermined temperature.

9. In a mold structure having a frame including an upwardly facing curved mold surface, and opposite end sections that are hinged to the frame, said hinged sections having an upper position providing a desired curvature to glass which sagged into contact therewith and in which position glass sag into contact therewith is restrained against endwise movement relative to the hinged sections: lever means which when moved in a given direction move said hinged end sections downwardly out of engagement with glass which has sagged and rigidified against the curved end sections of the mold when in said upper position, and a heat responsive member carried by said mold structure for moving said lever means in said given direction to provide relative separation of the rigidified curved glass and said curved end sections of said mold in response to a reduction in environmental temperature.

References Cited by the Examiner

UNITED STATES PATENTS 2,554,572   5/1951   Jendrisak _____ 65—289
2,840,953   7/1958   Black _____ 65—160
3,023,542   3/1962   Babcock _____ 65—289

DONALL H. SYLVESTER, *Primary Examiner.*

A. D. KELLOGG, *Assistant Examiner.*